United States Patent
Sugiyama

[11] 3,955,883
[45] May 11, 1976

[54] WIDE ANGLE PHOTOGRAPHIC LENS
[75] Inventor: Takahiro Sugiyama, Tokyo, Japan
[73] Assignee: Asahi Kogaku Kogyo Kabushiki Kaisha, Tokyo, Japan
[22] Filed: Feb. 6, 1975
[21] Appl. No.: 547,683

[30] Foreign Application Priority Data
Mar. 7, 1974 Japan.............................. 49-26594

[52] U.S. Cl. .................................................. 350/215
[51] Int. Cl.² ........................................ G02B 9/62
[58] Field of Search .................................... 350/215

[56] References Cited
UNITED STATES PATENTS
1,955,590  4/1934  Lee ..................................... 350/215
3,645,605  2/1972  Nakagawa ........................... 350/215
3,884,556  5/1975  Nakagawa ........................... 350/215

Primary Examiner—John K. Corbin
Assistant Examiner—Conrad Clark
Attorney, Agent, or Firm—Sughrue, Rothwell, Mion, Zinn & Macpeak

[57] ABSTRACT

A wide angle photographic lens consisting of six lenses wherein the following conditions are satisfied;

(1) $\nu_1, \nu_2 > 50$ (2) $F/1.3 < |F_{1,2}| < F/0.75,\ F_{1,2} < 0$ (3) $0.1 < |r_3/r_6| < 1.5$

2 Claims, 10 Drawing Figures

3,955,883

WIDE ANGLE PHOTOGRAPHIC LENS

SUMMARY OF THE INVENTION

This invention relates to a wide angle lens for photographic cameras of retrofocus type, and more particularly to a wide angle lens which has an aperture ratio of 1:2.8 to 1:3.5 and a field angle of 75° wherein the back focal length is 1.3 times as long as the composite focal length thereof and various aberrations owing to the compactness of the lens system are effectively corrected. This is accomplished by providing a wide angle photographic lens consisting of six lenses wherein the following conditions are satisfied;

(1) $\nu_1, \nu_2 > 50$ (2) $F/1.3 < |F_{1 \cdot 2}| < F/0.75, F_{1 \cdot 2} < 0$ (3) $0.1 < |r_5/r_6| < 1.5$

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENTS

Figure 1:
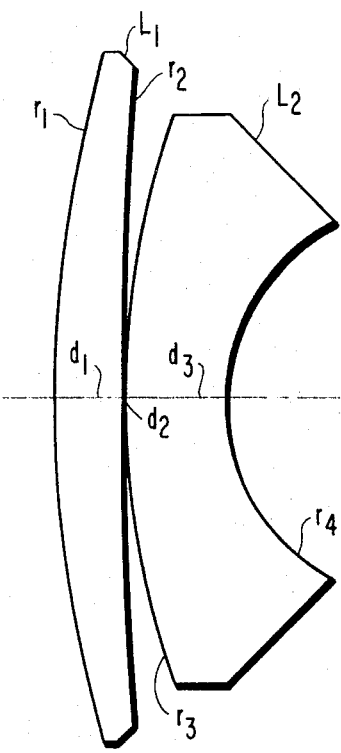
FIG. 1 is a longitudinal view showing the lens system in accordance with the first embodiment of the invention.
Figure 1:
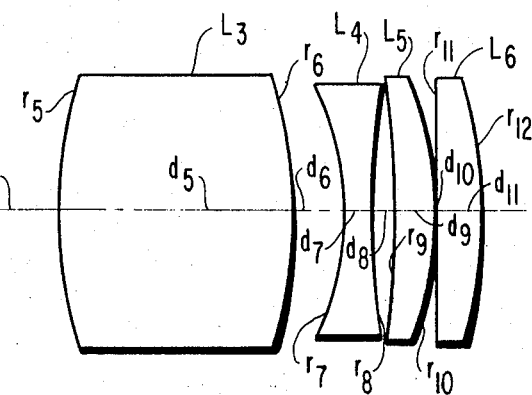

Describing the structure of the lens system of the present invention, the first lens is a positive lens, the second lens is a negative meniscus lens convex to the object, the third lens is a double convex lens, the fourth lens is a double concave lens, the fifth lens is a positive meniscus lens convex to the image, and the sixth lens is a positive lens. The conditions satisfied by the lens system of the present invention are as follows wherein the reference characters are defined as:

$F$: composite focal length of the whole lens system
$F_{1 \cdot 2 \cdots i}$: composite focal length of the lens system consisting of the first to the $i$-th lens
$r_j$: radius of curvature of the $j$-th surface
$d_j$: the $j$-th lens thickness or space
$L_i$: the $i$-th lens
$N_i$: refractive index of the $i$-th lens
$\nu_i$: Abbe's number of the $i$-th lens, (1) $\nu_1, \nu_2 > 50$ (2) $F/1.3 < |F_{1 \cdot 2}| < F/0.75, F_{1 \cdot 2} < 0$ (3) $0.1 < |r_5/r_6| < 1.5$ Now the above conditions will be described in detail. As the field angle increases in a wide angle lens, the lateral chromatic aberration increases and the quality of the image is greatly degraded.

The first conditions (1) are defined for eliminating the degradation of the chromatic aberration caused by the enlarged field angle. Since the difference between the lateral chromatic aberration of the marginal light passing through the first and second lenses $L_1$ and $L_2$ and that of the central light passing through the central part of the lenses $L_1$ and $L_2$ is liable to become large in the front diverging lens component consisting of the first and the second lenses $L_1$ and $L_2$, Abbe's numbers $\nu_1$ and $\nu_2$ of the lenses $L_1$ and $L_2$ are preferred to be as large as possible. If it becomes smaller than or equal to 50, the chromatic aberration must be eliminated by the lenses behind the second lens to a great extent, which requires the lenses to have a large refractive index and have a large thickness or spacing between lenses. The increase in the refractive index causes degradation in aberrations, and the enlargement of the thickness of the lenses or the spacing between lenses makes it difficult to obtain a compact lens system.

The second conditions (2) are defined for obtaining a desired back focal length so that the wide angle lens may be mounted to cameras. When the composite focal length defined here becomes not shorter than the upper limit $F/0.75$, the whole size of the lens system becomes too large to obtain the desired back focal length. When it becomes not longer than the lower limit $F/1.3$, the burden on the negative lens to diverge the light becomes too large and the aberrations are liable to be degraded. In addition, the focal length of the converging lens system behind the second lens becomes too short and accordingly, the balance in aberrations is considerably degraded.

The third conditions (3) are defined for making the lens system compact in size by correcting the positive sine condition based on the comparatively large refractive index of the divergent lens system. When the ratio as defined becomes larger than or equal to the upper limit of 1.5, it becomes difficult to correct the sine condition. When the ratio as defined becomes not larger than the lower limit of 0.1, it becomes difficult to correct the negative distortion caused by the divergent lens system.

The wide angle lens in accordance with the present invention is characterized in that the field angle is as large as 75° and the aperture ratio is as large as 1:2.8 and 1:3.5 and the back focal length is sufficiently long as 1.3 times as long as the composite focal length of the whole lens system. Further, the lens system in accordance with the present invention is considerably improved of its aberrations in spite of the small size of the lens system. Particularly, the chromatic aberration of magnification is quite improved.

Two specific examples of the present invention will be described hereinbelow.

The first example is shown in FIG. 1 and consists of a positive meniscus lens $L_1$, a negative meniscus lens $L_2$ convex to the object, a thick double convex lens $L_3$, a double concave lens $L_4$, a positive meniscus lens $L_5$ convex to the image, and a positive meniscus lens $L_6$ also convex to the image. The radii $r_1$ to $r_{12}$ and the thickness and separations $d_1$ to $d_{11}$, along with the refractive indices $N_1$ to $N_6$ and Abbe numbers $\nu_1$ to $\nu_6$ for lenses $L_1$ to $L_6$ which comprise a wide angle lens having an aperture ratio of 1:2.8 and a field angle of 75° are given in Table I as follows:

TABLE I $F = 100$
back focal length = 130.662
$F_{1,2} = -106.952$

| Lens | | Radius of Curvature r | Lens Thickness or Distance d | Refractive Index N | Abbe No. $\nu$ |
|---|---|---|---|---|---|
| $L_1$ | $r_1 =$ | 268.630 | | | |
| | | | $d_1 =$ 12.54 | $N_1=1.62280$ | $\nu_1=57.0$ |
| | $r_2 =$ | 1489.437 | | | |
| | | | $d_2 =$ 0.35 | | |
| $L_2$ | $r_3 =$ | 179.577 | | | |
| | | | $d_3 =$ 19.23 | $N_2=1.62041$ | $\nu_2=60.3$ |
| | $r_4 =$ | 38.908 | | | |
| | | | $d_4 =$ 45.42 | | |
| $L_3$ | $r_5 =$ | 94.880 | | | |
| | | | $d_5 =$ 44.26 | $N_3=1.72000$ | $\nu_3=43.7$ |
| | $r_6 =$ | -85.317 | | | |
| | | | $d_6 =$ 10.56 | | |
| $L_4$ | $r_7 =$ | -62.000 | | | |
| | | | $d_7 =$ 4.23 | $N_4=1.74077$ | $\nu_4=27.8$ |
| | $r_8 =$ | 137.345 | | | |
| | | | $d_8 =$ 4.86 | | |
| $L_5$ | $r_9 =$ | -237.782 | | | |
| | | | $d_9 =$ 8.06 | $N_5=1.62041$ | $\nu_5=57.0$ |
| | $r_{10} =$ | -64.877 | | | |
| | | | $d_{10} =$ 0.35 | | |
| $L_6$ | $r_{11} =$ | -1802.817 | | | |
| | | | $d_{11} =$ 8.52 | $N_6=1.62041$ | $\nu_6=60.3$ |
| | $r_{12} =$ | -81.169 | | | |

Figure 2A:
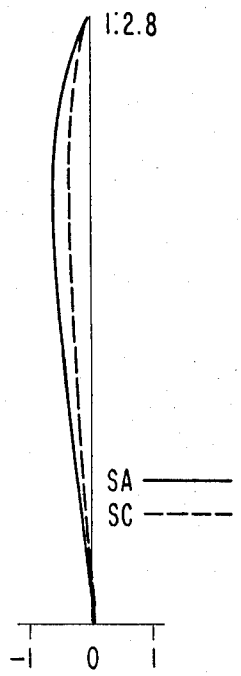
FIGS. 2a to 2d show aberration curves of the lens system of the first embodiment.
Figure 2B:
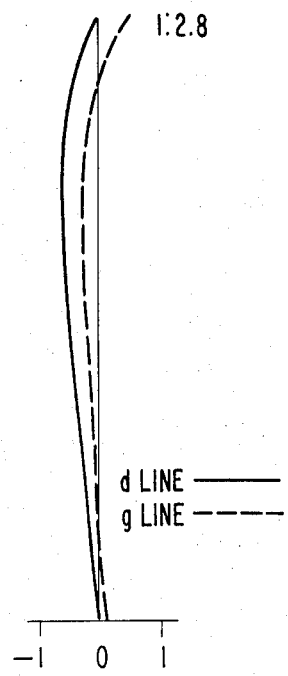
Figure 2C:
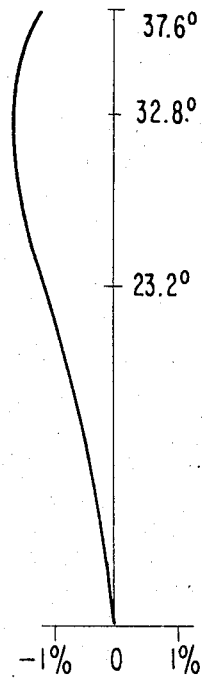
Figure 2D:
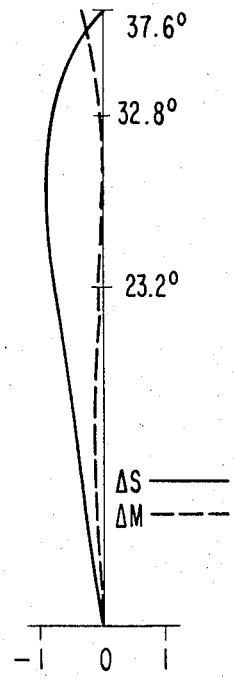

FIG. 2a shows the spherical aberration and sine condition, FIG. 2b shows the chromatic aberration, FIG. 2c shows the distortion, and FIG. 2d shows the astigmatism of the lens system shown in FIG. 1 and defined in Table 1.

Figure 3:
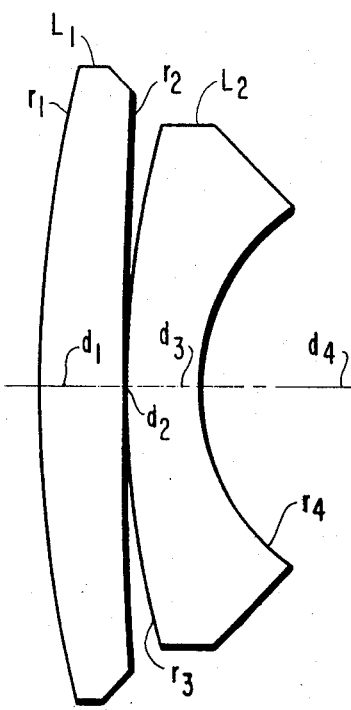
FIG. 3 is a longitudinal view showing the lens system in accordance with the second embodiment of the invention.
Figure 3:
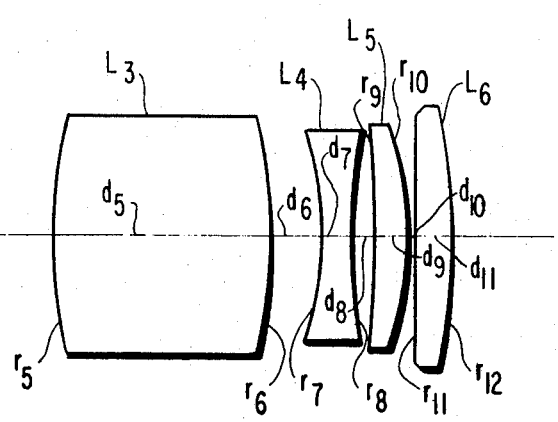

The second example is shown in FIG. 3 and consists of a positive meniscus lens $L_1$, a negative meniscus lens $L_2$ convex to the object, a thick double convex lens $L_3$, a double concave lens $L_4$, a positive meniscus lens $L_5$ convex to the image, and a positive meniscus lens $L_6$ also convex to the image. The radii $r_1$ to $r_{12}$ and the thickness and separations $d_1$ to $d_{11}$, along with the refractive indices $N_1$ to $N_6$ and Abbe numbers $\nu_1$ to $\nu_6$ for lenses $L_1$ to $L_6$ which comprise a wide angle lens having an aperture ratio of 1:3.5 and a field angle of 75° are given in Table II as follows:

TABLE II $F = 100$
back focal length = 130.113
$F_{1,2} = -101.729$

| Lens | | Radius of Curvature r | Lens Thickness or Distance d | Refractive Index N | Abbe No. $\nu$ |
|---|---|---|---|---|---|
| $L_1$ | $r_1 =$ | 271.127 | | | |
| | | | $d_1 =$ 16.59 | $N_1=1.62280$ | $\nu_1=57.0$ |
| | $r_2 =$ | 3970.472 | | | |
| | | | $d_2 =$ 0.35 | | |
| $L_2$ | $r_3 =$ | 213.933 | | | |
| | | | $d_3 =$ 13.45 | $N_2=1.62041$ | $\nu_2=60.3$ |
| | $r_4 =$ | 39.169 | | | |
| | | | $d_4 =$ 45.74 | | |
| $L_3$ | $r_5 =$ | 83.475 | | | |
| | | | $d_5 =$ 41.13 | $N_3=1.72000$ | $\nu_3=43.7$ |
| | $r_6 =$ | -100.352 | | | |
| | | | $d_6 =$ 10.56 | | |
| $L_4$ | $r_7 =$ | -63.380 | | | |
| | | | $d_7 =$ 3.98 | $N_4=1.74077$ | $\nu_4=27.8$ |
| | $r_8 =$ | 127.465 | | | |
| | | | $d_8 =$ 3.78 | | |
| $L_5$ | $r_9 =$ | -256.651 | | | |
| | | | $d_9 =$ 7.22 | $N_5=1.62280$ | $\nu_5=57.0$ |
| | $r_{10} =$ | -57.049 | | | |
| | | | $d_{10} =$ 0.35 | | |
| $L_6$ | $r_{11} =$ | -2112.676 | | | |
| | | | $d_{11} =$ 7.36 | $N_6=1.62041$ | $\nu_6=60.3$ |
| | $r_{12} =$ | -93.014 | | | |

Figure 4A:
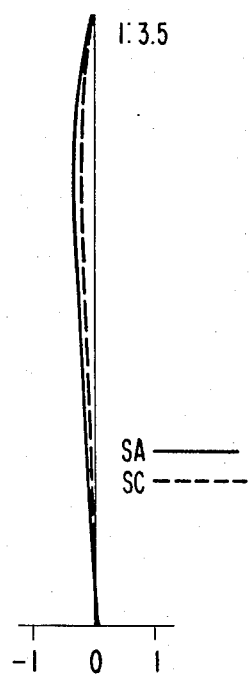
FIGS. 4a to 4d show aberration curves of the lens system of the second embodiment of the invention.
Figure 4B:
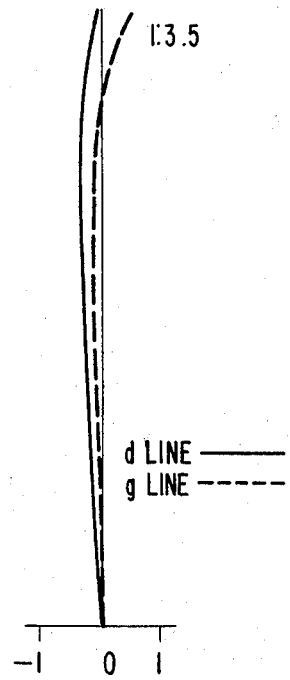
Figure 4C:
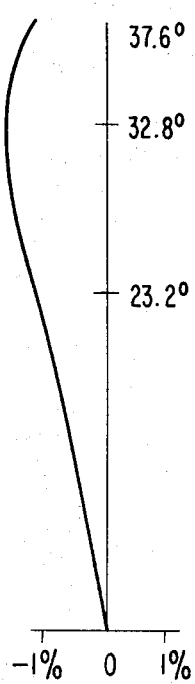
Figure 4D:
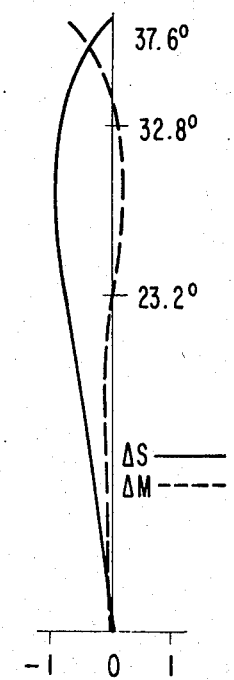

FIG. 4a shows the spherical aberration and sine condition, FIG. 4b shows the chromatic aberration, FIG. 4c shows the distortion, and FIG. 4d shows the astigmatism of the lens system shown in FIG. 3 and defined in Table II.

It will be apparent that the embodiments shown are only exemplary and that various modifications can be made in construction and arrangement within the scope of the invention as defined in the appended claims.

What is claimed is:

1. A wide angle lens consisting of six lenses wherein the following conditions are satisfied:

(1) $\nu_1, \nu_2 > 50$ (2) $F/1.3 < |F_{1,2}| < F/0.75$, $F_{1,2} < 0$ (3) $0.1 < |r_5/r_6| < 1.5$ wherein the characters designate dimensions as follows:

F: composite focal length
$F_{1,2}$: composite focal length of the lens system consisting of the first and second lenses
$\nu_i$: Abbe's number of the i-th lens
$r_j$: the radius of curvature of the j-th surface, wherein the first lens is a positive meniscus lens convex to the object, the second lens is a positive meniscus lens convex to the object, the third lens is a thick double convex lens, the fourth lens is a double concave lens, the fifth lens is a positive meniscus lens convex to the image, and the sixth lens is a positive meniscus lens convex to the image, and wherein the radii $r_1$ to $r_{12}$, the thicknesses and separations $d_1$ to $d_{11}$, the refractive indices $N_1$ to $N_6$, and Abbe numbers $\nu_1$ to $\nu_6$ of said first to sixth lenses $L_1$ to $L_6$, respectively, satisfy the following conditions:

$F = 100$
back focal length = 130.662
$F_{1,2} = -106.952$

| Lens | | Radius of Curvature r | Lens Thickness or Distance d | Refractive Index N | Abbe No. $\nu$ |
|---|---|---|---|---|---|
| $L_1$ | $r_1 =$ | 268.630 | | | |
| | | | $d_1 =$ 12.54 | $N_1=1.62280$ | $\nu_1=57.0$ |
| | $r_2 =$ | 1489.437 | | | |
| | | | $d_2 =$ 0.35 | | |
| $L_2$ | $r_3 =$ | 179.577 | | | |
| | | | $d_3 =$ 19.23 | $N_2=1.62041$ | $\nu_2=60.3$ |
| | $r_4 =$ | 38.908 | | | |
| | | | $d_4 =$ 45.42 | | |
| $L_3$ | $r_5 =$ | 94.880 | | | |
| | | | $d_5 =$ 44.26 | $N_3=1.72000$ | $\nu_3=43.7$ |
| | $r_6 =$ | -85.317 | | | |
| | | | $d_6 =$ 10.56 | | |
| $L_4$ | $r_7 =$ | -62.000 | | | |
| | | | $d_7 =$ 4.23 | $N_4=1.74077$ | $\nu_4=27.8$ |
| | $r_8 =$ | 137.345 | | | |
| | | | $d_8 =$ 4.86 | | |
| $L_5$ | $r_9 =$ | -237.782 | | | |
| | | | $d_9 =$ 8.06 | $N_5=1.62041$ | $\nu_5=57.0$ |
| | $r_{10} =$ | -64.877 | | | |
| | | | $d_{10} =$ 0.35 | | |
| $L_6$ | $r_{11} =$ | -1802.817 | | | |
| | | | $d_{11} =$ 8.52 | $N_6=1.62041$ | $\nu_6=60.3$ |
| | $r_{12} =$ | -81.169 | | | |

2. A wide angle lens consisting of six lenses wherein the following conditions are satisfied:

(1) $\nu_1, \nu_2 > 50$ (2) $F/1.3 < |F_{1,2}| < F/0.75$, $F_{1,2} < 0$ (3) $0.1 < |r_5/r_6| < 1.5$ wherein the characters designate dimensions as follows:

$F$: composite focal length $F_{1,2}$: composite focal length of the lens system consisting of the first and second lenses $\nu_i$: Abbe's number of the $i$-th lens $r_j$: the radius of curvature of the $j$-th surface, wherein the first lens is a positive meniscus lens convex to the object, the second lens is a positive meniscus lens convex to the object, the third lens is a thick double convex lens, the fourth lens is a double concave lens, the fifth lens is a positive meniscus lens convex to the image, and the sixth lens is a positive meniscus lens convex to the image, and wherein the radii $r_1$ to $r_{12}$, the thicknesses and separations $d_1$ to $d_{11}$, the refractive indices $N_1$ to $N_6$, and Abbe numbers $\nu_1$ to $\nu_6$ of said first to sixth lenses $L_1$ to $L_6$, respectively, satisfy the following conditions:

$F = 100$ back focal length $= 130.113$ $F_{1,2} = -101.729$

| Lens | Radius of Curvature r | | Lens Thickness or Distance d | | Refractive Index N | Abbe No. $\nu$ |
|---|---|---|---|---|---|---|
| $L_1$ | $r_1 =$ | 271.127 | $d_1 =$ | 16.59 | $N_1 = 1.62280$ | $\nu_1 = 57.0$ |
| | $r_2 =$ | 3970.472 | $d_2 =$ | 0.35 | | |
| $L_2$ | $r_3 =$ | 213.933 | $d_3 =$ | 13.45 | $N_2 = 1.62041$ | $\nu_2 = 60.3$ |
| | $r_4 =$ | 39.169 | $d_4 =$ | 45.74 | | |
| $L_3$ | $r_5 =$ | 83.475 | $d_5 =$ | 41.13 | $N_3 = 1.72000$ | $\nu_3 = 43.7$ |
| | $r_6 =$ | −100.352 | $d_6 =$ | 10.56 | | |
| $L_4$ | $r_7 =$ | −63.380 | $d_7 =$ | 3.98 | $N_4 = 1.74077$ | $\nu_4 = 27.8$ |
| | $r_8 =$ | 127.465 | $d_8 =$ | 3.78 | | |
| $L_5$ | $r_9 =$ | −256.651 | $d_9 =$ | 7.22 | $N_5 = 1.62280$ | $\nu_5 = 57.0$ |
| | $r_{10} =$ | −57.049 | $d_{10} =$ | 0.35 | | |
| $L_6$ | $r_{11} =$ | −2112.676 | $d_{11} =$ | 7.36 | $N_6 = 1.62041$ | $\nu_6 = 60.3$ |
| | $r_{12} =$ | −93.014 | | | | |

* * * * *